March 11, 1969  P. A. L. POSSO  3,432,066
BOX FOR STORING A SPOOL OF TAPE OR FILM
Filed Aug. 22, 1967
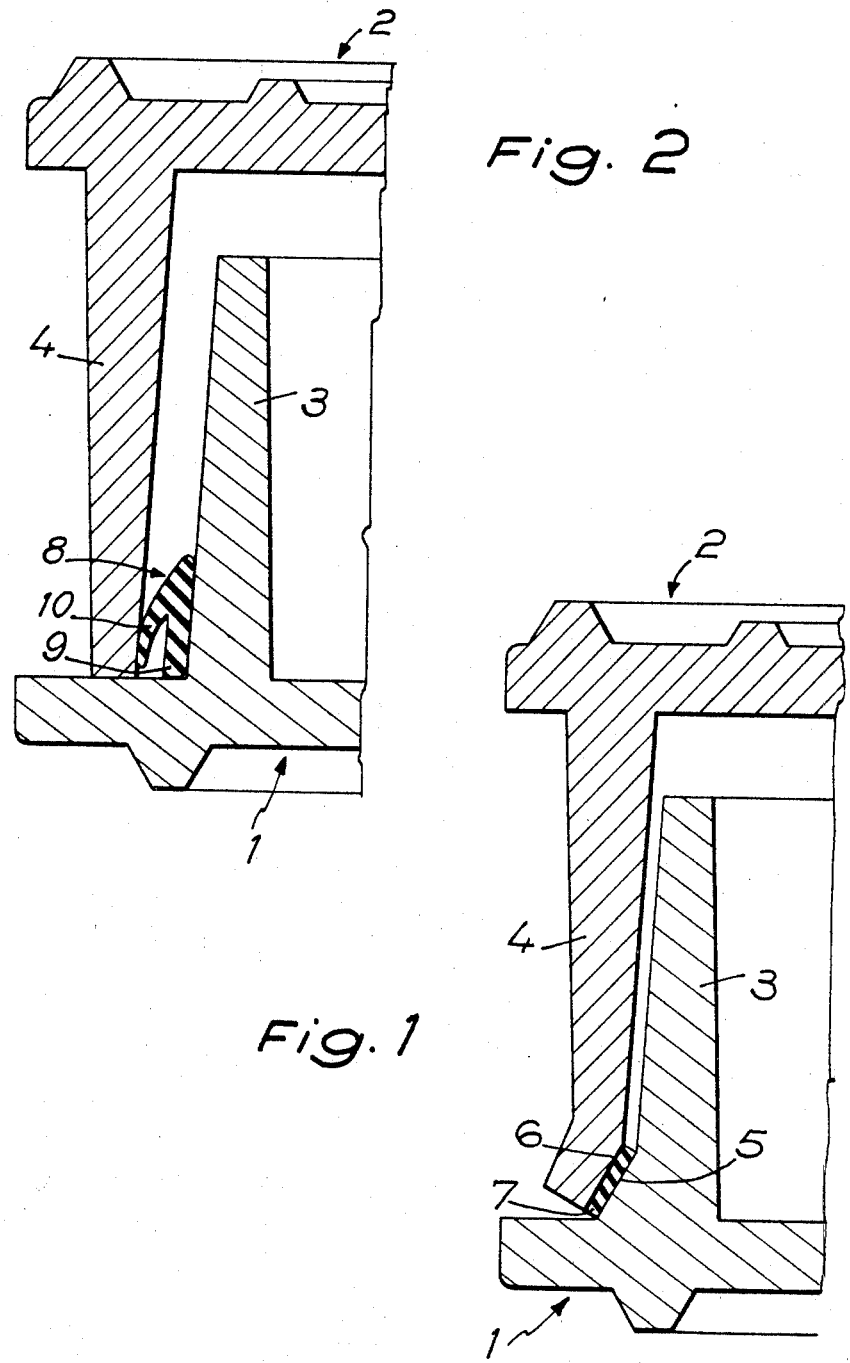
Inventor:
Pierre A.L. Posso
By: Spencer & Kaye
Attorneys

United States Patent Office 3,432,066
Patented Mar. 11, 1969

3,432,066
BOX FOR STORING A SPOOL OF TAPE OR FILM
Pierre A. L. Posso, 20 Rue Gandon, Paris 13, France
Filed Aug. 22, 1967, Ser. No. 662,406
Claims priority, application France, July 4, 1967, 112,897
U.S. Cl. 220—46
Int. Cl. B65d 53/00, 85/04; B65h 75/02
4 Claims

ABSTRACT OF THE DISCLOSURE

Sealable box for storing a spool, for example a spool of magnetic tape. The box has a base and a cover each with a rim, and a locking device for holding base and cover together in the closed position of the box. The rims have sealing means such that when the base and cover are moved towards one another closing, the sealing means seals the space between the rims by virtue of a movement which is transverse to the direction of movement of the base and cover towards one another.

---

The known sealed boxes designed for storing spools of magnetic tapes are generally cylindrical and their two openable parts are joined by a central impervious locking device, and in addition a sealing joint is provided at the periphery of the said parts.

The joint in question consists of a flexible fitting in the form of a rim on the edge of one of the openable parts and is arranged opposite the encasing portion of the other part. To ensure a tight seal at the periphery, an axially directed pressure must therefore be applied to the said fitting.

As regards the central locking device, various embodiments have been used.

According to one embodiment, this device comprises a rubber sleeve of small diameter placed on a rotatably mounted shaft in one of the openable parts. The sleeve is interposed between the latter and an axially movable member the displacement of which is produced by spiral slopes cooperating with a finger on the rotatable shaft. In other words, axial displacement of the movable part is produced by rotating the shaft and one thereby causes the rubber sleeve to expand radially. This sleeve then bears against the circular edge of the openable part of the box opposite to that part which carries the said sleeve.

According to another embodiment, the locking device comprises a toroidal rubber ring surrounding sectors which are mounted to be slidable in the radial direction relatively to one of the openable parts of the box, in which part a central shaft is rotatably mounted, which shaft is equipped with cam elements against which the above mentioned sectors bear. Under these conditions, rotating the cam shaft produces displacement of the sectors and hence radial expansion of the toroidal rubber ring which bears against the circular edge of the openable part of the box opposite to that which carries this device.

What has been said above shows that locking the box is achieved by radial deformation of a rubber joint and that this locking does not determine with absolute precision the relative positions in the axial direction of the two openable parts of the said box. Moreover, obtaining a tight seal by means of the peripheral fitting is only possible by axial displacement of the two openable parts and when these occupy an accurately defined position relative to each other. There is therefore an incompatibility between obtaining central locking and obtaining an impervious peripheral seal. Consequently, the control of the locking device satisfactorily ensures that the box will be closed but cannot ensure that it will be sealed at the periphery. Experience moreover confirms that this seal is unreliable in practice.

It is thus the object of the present invention to make the obtaining of a tight seal no longer dependent on the method of locking.

To this end and in accordance with the invention, the joining is effected between two elements of the encasing elements of the box transforming the axial displacement of these encasings into a radial displacement which brings the said elements closer together and produces by reaction a contact pressure and an impervious seal.

According to a first embodiment of the object of the invention, the joining elements consist of two conical surfaces formed on the said encasing members. Preferably, a flexible sealing element is rendered integral with at least one of the surfaces.

According to a second embodiment, one of the joining elements consists of a lip joint, one of the lips of which is fixed to the corresponding encasing element whilst the other is free and elastically deformable to cooperate with the said encasing element.

Various other features of the invention will emerge from the detailed description which follows.

Two embodiments of the object of the invention are shown by way of non-limiting examples in the attached drawing.

In FIGURES 1 and 2 of the drawing, which are diagrammatic partial sectional views on an enlarged scale, the reference numeral 1 denotes the body and 2 to lid of a sealed box designed to contain preferably a spool of magnetic tape or a spool of cinematographic film.

The body and lid are integral with the cylindrical encasing members 3 and 4 between which the impervious seal is to be formed.

According to the first embodiment illustrated in FIGURE 1, truncated cone-shaped surfaces 5 and 6 are formed respectively at the base of the encasing member 3 of the body and at the free end of the encasing member 4 of the lid. These surfaces are designed to be brought into contact when the box is closed to ensure an impervious seal. Preferably, the slope of these surfaces is so chosen that the surfaces will tend to bear against each other by friction and under the effect of the thrust of the fitting.

To correct geometrical errors due to tolerances in manufacture and inequality in deformation, it is advantageous to interpose a relatively thin sealing fitting 7 between the surfaces 5 and 6, which fitting is made integral with either one or other of the said surfaces.

By this arrangement, the function of peripheral sealing and that of central locking can be fulfilled independently of each other. Consequently, peripheral sealing is automatically ensured when the box is closed, and when the two parts of the box are then locked by means of the central device, this seal cannot be destroyed.

According to a second embodiment shown in FIGURE 2, a lipped joint 8 is interposed between the encasing members 3 and 4. In the embodiment shown, this joint is V-shaped in section and therefore has two lips 9 and 10. The lip 9 is rendered integral with the base of the encasing member 3 by any suitable means, such as glueing for example, whereas the lip 10 is free. This joint is mounted in such a fashion that the lips converge towards the opening of the encasing member 3. Under these conditions, the free lip 10 is capable of deformation in radial directions from a position of rest to a position under tension. This deformation is moreover produced by the encasing member 4 of the lid 2 when it is fitted on the encasing member 3. The elastic recoil force of the joint 8 causes the lip 10 to bear against the member 4 with sufficient contact pressure to ensure a tight seal.

In this case, as in the preceding case, the function of peripheral sealing can be fulfilled independently of the function of central locking without the one having any repercussions on the other. In effect, on closing the box, one deforms the joint 8 which ensures the said seal, and this seal cannot be destroyed when the box is locked by operating the central device.

The invention is not limited to the embodiments shown and described in detail since various modifications may be applied without going outside its scope.

What I claim is:

1. A sealable box for storing a spool of tape or film and comprising: a base having an upstanding rim; a cover removable from said base and having an upstanding rim; one said rim being disposed within the other said rim and surrounding the contained spool when said box is closed; and sealing means between said rims and defining two frustoconical surfaces each mounted on a respective one of said rims, said sealing means being such that closing movement of said base and said cover toward one another causes a movement of said sealing means in a direction approximately transverse to the direction of such closing movement, said frustoconical surfaces being opposite one another when said box is closed.

2. A sealable box for storing a spool of tape or film and comprising: a base having an upstanding rim; a cover removable from said base and having an upstanding rim; one said rim being disposed within the other said rim and surrounding the contained spool when said box is closed; and sealing means between said rims, said sealing means including a member having two lips, one said lip being fixed to one said rim and the other said lip being elastically deformable in sealing contact with the other said rim, said sealing means being such that closing movement of said base and said cover toward one another causes a movement of said sealing means in a direction approximately transverse to the direction of such closing movement.

3. Box according to claim 2 wherein said member is of V cross section, said V converging toward the free end of said one rim.

4. A box as defined in claim 1 wherein a resilient sealing member is fixed to one of said rims and defines one of said surfaces.

References Cited

UNITED STATES PATENTS

| 3,101,844 | 8/1963 | Myers | 206—52 |
| 3,343,666 | 9/1967 | Mathus | 206—52 |

GEORGE T. HALL, *Primary Examiner.*

U.S. Cl. X.R.

206—52